(12) United States Patent
Chu et al.

(10) Patent No.: US 10,378,172 B2
(45) Date of Patent: Aug. 13, 2019

(54) YIELDABLE CONSTRUCTION METHOD FOR EARLY RELEASING SURROUNDING ROCK DEFORMATION ON WEAK COUNTER-INCLINED SLOPE

(71) Applicant: PowerChina Huadong Engineering Corporation Limited, Hangzhou (CN)

(72) Inventors: Weijiang Chu, Hangzhou (CN); Chunsheng Zhang, Hangzhou (CN); Jing Hou, Hangzhou (CN); Jiayao Wu, Hangzhou (CN); Yong Zhou, Hangzhou (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 179 days.

(21) Appl. No.: 15/622,644

(22) Filed: Jun. 14, 2017

(65) Prior Publication Data
US 2018/0010316 A1    Jan. 11, 2018

(30) Foreign Application Priority Data
Jul. 6, 2016    (CN) .......................... 2016 1 0539275

(51) Int. Cl.
| | | |
|---|---|---|
| *E02D 17/00* | (2006.01) | |
| *E02D 17/18* | (2006.01) | |
| *E02D 17/16* | (2006.01) | |
| *E02D 17/20* | (2006.01) | |
| *F42D 3/04* | (2006.01) | |

(52) U.S. Cl.
CPC ............. *E02D 17/18* (2013.01); *E02D 17/16* (2013.01); *E02D 17/20* (2013.01); *F42D 3/04* (2013.01); *Y02A 10/24* (2018.01)

(58) Field of Classification Search
CPC .................................. E02D 17/00; E02D 17/18
See application file for complete search history.

(56) References Cited

U.S. PATENT DOCUMENTS 3,735,704 A * 5/1973 Livingston .............. E21C 37/16
102/301

\* cited by examiner

*Primary Examiner* — Janine M Kreck
(74) *Attorney, Agent, or Firm* — Wayne & Ken, LLC; Tony Hom

(57) ABSTRACT

The present invention provides a yieldable construction method for early releasing surrounding rock deformation on a weak toppling slope, thereby reducing surrounding rock toppling deformation risk in and after an excavation process and ensuring overall slope stability and safety of a supporting structure. A technical solution of the present invention is as follows: loosing a rock mass through controlled blasting; inducing toppling deformation of the slope by injecting water and softening a blasting relaxation part of the rock mass; determining timing of water injection by monitoring slope surface displacement characteristics of the slope; and performing a normal excavation process of the toppling deformation slope after injecting is completed. The present invention is applicable to design and construction of high slope engineering of a special kind of rocks, i.e., a toppling deformation slope composed of weak rock masses.

10 Claims, 3 Drawing Sheets

YIELDABLE CONSTRUCTION METHOD FOR EARLY RELEASING SURROUNDING ROCK DEFORMATION ON WEAK COUNTER-INCLINED SLOPE

FIELD OF THE INVENTION

The present invention relates to a yieldable construction method for early releasing surrounding rock deformation on a weak counter-inclined slope. The construction method is applicable to design and construction of high slope engineering of a special kind of rocks, i.e., a toppling deformation slope composed of weak rock masses.

BACKGROUND OF THE INVENTION

For a slope formed by stratified rock masses with low strength such as slate, schist, etc., when a rock level strike direction intersects with a slope surface in a small angle and a rock level tendency is opposite to a slope surface tendency, a bending toppling deformation slope is formed. The toppling deformation slope formed by the weak rock masses often experiences strong toppling deformation in history. Shallow rock masses on the slope are relaxed and broken, and the difficulty of excavating such slope is that large toppling deformation is difficult to be controlled in a construction period. Even if slope excavation and support are completed, the toppling deformation may be sustainably developed, and particularly under the influences of factors such as rainfall, etc., continuous toppling deformation of the slope may cause phenomena that a supporting structure of the constructed slope is damaged (an anchor cable is broken, and a frame beam is collapsed), a riding track is dislocated, etc.

SUMMARY OF THE INVENTION

A technical problem to be solved in the present invention is that: with respect to the existing problem above, a yieldable construction method for early releasing surrounding rock deformation on a weak counter-inclined slope is provided, thereby reducing surrounding rock toppling deformation risk in and after an excavation process and ensuring overall slope stability and safety of a supporting structure.

A technical solution adopted in the present invention is as follows: the yieldable construction method for early releasing the surrounding rock deformation on the weak counter-inclined slope is characterized by:

loosing a rock mass through controlled blasting;
inducing toppling deformation of the slope by injecting water and softening a blasting relaxation part of the rock mass;
determining timing of water injection by monitoring slope surface displacement characteristics of the slope; and
performing a normal excavation process of the toppling deformation slope after the injecting is completed.

The construction method in the present invention includes the following specific steps:
a. excavating a plurality of construction adits inside a slope excavation contour line, drilling blast holes in the construction adits, and completing blasting charge;
b. arranging a plurality of surface displacement monitoring points on a slope surface, and monitoring slope surface displacement deformation characteristics;
c. detonating the blast holes;
d. drilling water injection holes through the construction adits after the slope surface displacement deformation characteristics monitored at the surface displacement monitoring points tend to be convergent;
e. injecting high-pressure water into surrounding rock relaxation parts produced by detonation via the water injection holes until a slope surface surrounding rock deformation increment caused in the water injection process is less than 5% compared with accumulative deformation, and stopping injecting water;
f. injecting a cement grout into slope foot through the water injection holes; and
g. performing a normal excavation process of the toppling deformation slope.

In the step e, the water is injected into the water injection holes through a cyclic water injection method; and in each water injection cycle process, water injection pressure is maintained to inject the water for a certain period of time, and after the slope surface displacement deformation characteristics monitored at the surface displacement monitoring points tend to be stable after water injection is stopped, the next water injection cycle is started.

In a first water injection cycle, the water injection pressure is controlled as 2 MPa, the injection pressure of 2 MPa is maintained for more than 5 hours, then the water injection pressure is reduced to 0.5 MPa, and the water injection pressure of 0.5 MPa is maintained for 2 days.

In a second water injection cycle, the water injection pressure is controlled as 0.5 MPa, and the water injection pressure of 0.5 MPa is maintained for 3 days.

In an (n+2)th water injection cycle, the water injection pressure is controlled as 0.5 MPa, and the water injection pressure of 0.5 MPa is maintained for 3 days, wherein n is a positive integer.

In the step f, grouting pressure of the cement grout is controlled as 0.2-0.3 MPa, and when a single-hole grouting rate is less than 0.5 L/min, grouting is stopped.

Totally three construction adits exist at different elevations in an excavation slope, i.e., a first adit, a second adit and a third adit in sequence from top to bottom.

Vertical elevation H1 of the first adit away from a slope opening line is equal to ⅓H, vertical elevation H2 of the second adit away from the slope opening line is equal to ⅔H, and the third adit is located at a slope toe excavation position. A vertical distance of each of the construction adits away from the slope surface is 0.2H-0.3H, and a vertical distance of each of the construction adits away from the excavation contour line is greater than or equal to 20 m and less than or equal to 40 m, wherein H is the height of a slope excavation area.

The blast holes are drilled in the slope surface side via the construction adits, and a drilling elevation angle is 25-40 degrees, wherein the blast holes are drilled towards the slope surface side through a downdip angle of 20-40 degrees via the third construction adit.

The length of the bottom of the drilled elevated blast hole away from the slope surface is 5-8 m, and the length direction of the drilled declined blast holes covers the slope toe excavation position.

The water injection holes are formed parallel to the blast holes.

Totally four rows of surface displacement monitoring points are arranged, wherein the arrangement elevation of the first row of surface displacement monitoring points is positioned at the slope opening line, the second and third rows of surface displacement monitoring points are arranged in the middle of the slope in equal ratios according to the elevation, and the arrangement elevation of the fourth row of surface displacement monitoring points is arranged at a position which is 3-5 m away from an upper side of the excavated slope toe.

The blast holes in the first adit and the second adit are detonated during blasting, and after the slope surface tends to be stable, the blast holes in the third adit are detonated.

The present invention has the beneficial effects that: an aim of loosing rock masses at specific parts is achieved through controlled blasting; and due to the water-expanding characteristic of slate and schist, toppling deformation is induced by performing water-infusion softening on rock masses at a blasting relaxation part, and surrounding rock toppling deformation risk in and after an excavation process is reduced, thereby ensuring overall slope stability and safety of a supporting structure.

DETAILED DESCRIPTION OF THE INVENTION

The present embodiment has the main characteristic that a slope deformation sensitive part is subjected to controlled blasting, and high-pressure water is injected to induce toppling deformation of the slope so as to reduce surrounding rock toppling deformation risk in and after an excavation process, thereby ensuring overall slope stability and safety of a supporting structure.

Figure 1:
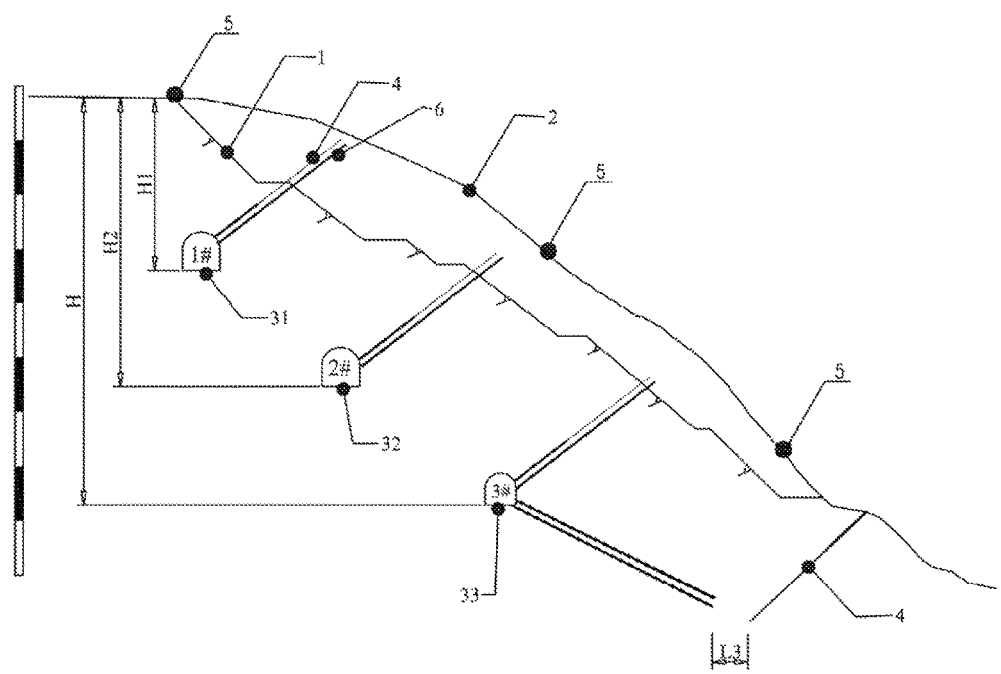
FIG. 1 is a structural schematic diagram of embodiments.
Figure 2:
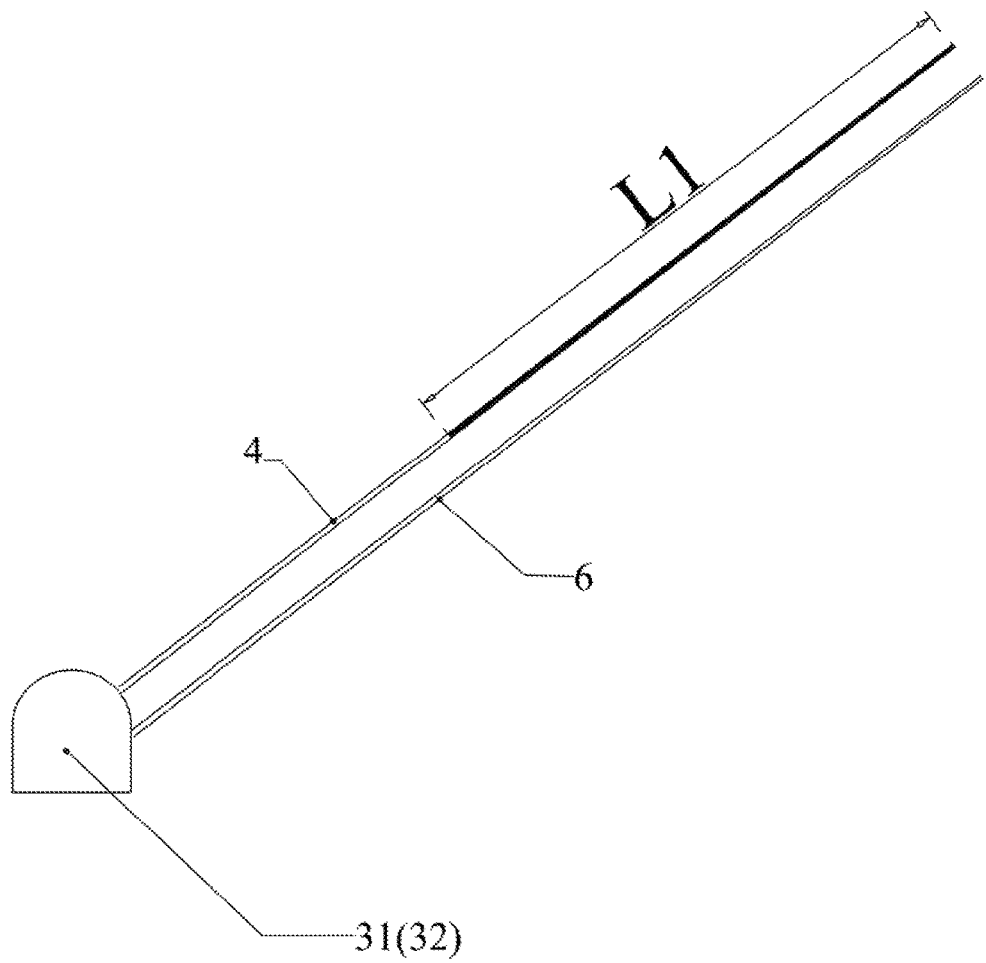
FIG. 2 is a schematic diagram of a position relationship among a first adit a second adit and blast holes in embodiments.
Figure 3:
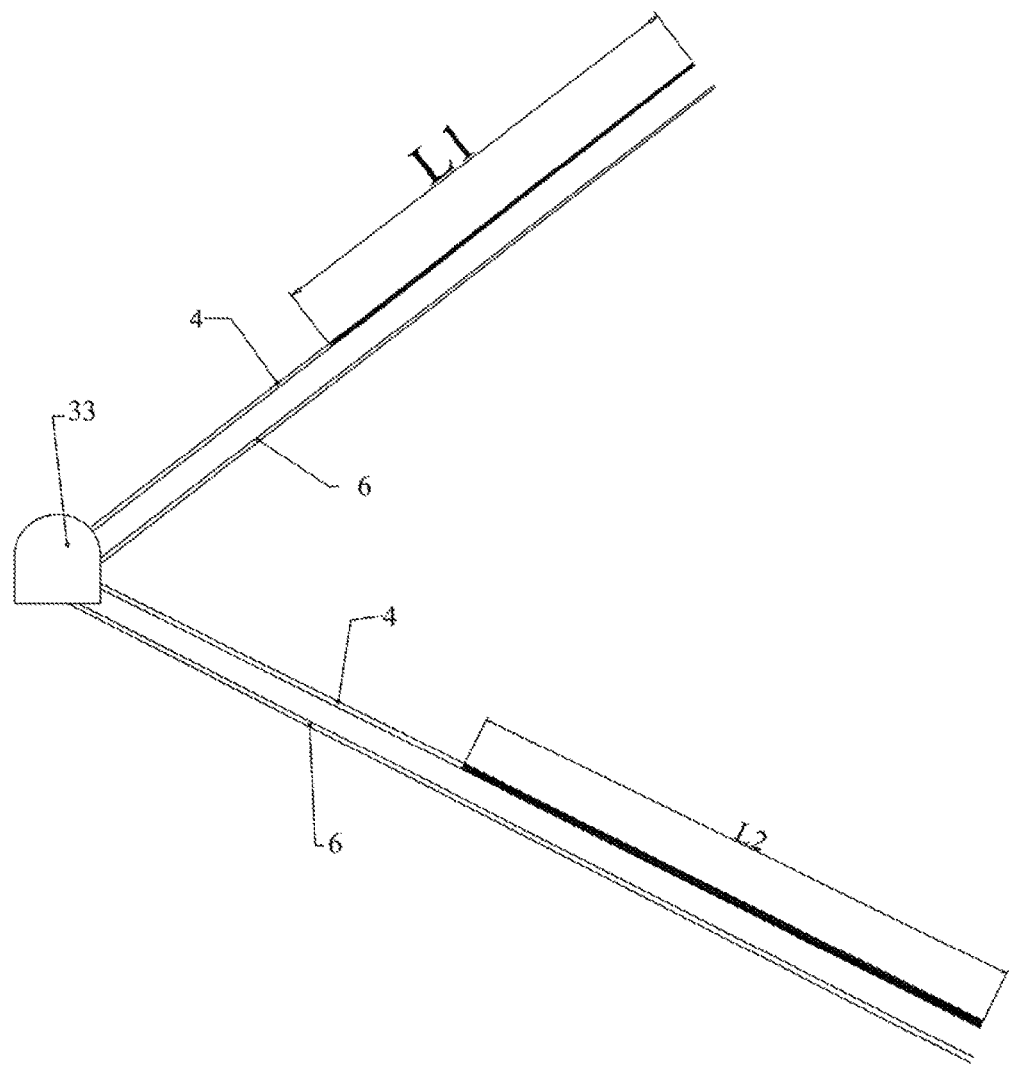
FIG. 3 is a schematic diagram of a position relationship between a third adit and blast holes in embodiments.

The present embodiment includes the following steps:

a. as shown in FIG. 1, arranging 3 pretreatment construction adits (including a first adit 31, a second adit 32 and a third adit 33) in a slope excavation contour line, and allowing an axis of each of the construction adits to be parallel to the excavation slope surface, wherein vertical elevation H1 of the first adit 31 away from a slope opening line is equal to ⅓H, vertical elevation H2 of the second adit 32 away from the constructed slope opening line is equal to ⅔H, and the third adit 33 is located at a slope toe excavation position. A vertical distance of the three construction adits away from the slope surface 2 is 0.2-0.3H, the vertical minimum distance of the construction adits away from the excavation contour line 1 shall not be less than 20 m, and the vertical maximum distance shall not exceed 40 m. H is the height of a slope excavation area in the present embodiment;

As shown in FIGS. 2 and 3, a blast hole 4 with a diameter of 90 mm is drilled by virtue of the three pretreatment construction adits, a drilling elevation angle is 25-40 degrees, the drilling length is based on a principle that a length of a hole bottom away from the slope surface 2 is 5-8 m, and a blasting charge length L1 is in a range from 15 m inside the excavation line to the hole bottom, wherein a declined blast hole 4 needs to be additionally drilled in the third adit 33, a downdip angle is 20-40 degrees, and the blasting charge length L2 is not less than L1 based on a principle that the drilled hole can cover the slope toe excavation position in the length direction. An array pitch of a controlled blast hole 4 arranged through the three construction adits along the construction adit direction is 5 m. A row of blast holes 4 is formed in the slope toe part, the charge length L2 is not less than L1, and a hole-bottom distance L3 between the row of blast holes and the downdip blast hole of the third adit 33 is controlled within 5 m.

b. arranging 4 rows of surface displacement monitoring points 5 on the slope surface 2, wherein the arrangement elevation of the first row of surface displacement monitoring points 5 is located at the slope opening line position, the second row of and the third row of surface displacement monitoring points are arranged in the middle of the slope at equal ratios according to the elevation, and the arrangement elevation of the fourth row of surface displacement monitoring points is located at a position which is 3-5 m away from the upper side of the excavated slope toe, and surrounding rock deformation increment characteristics at a slope surface monitoring part in the slope blasting process and the water injection process are recorded at the surface displacement monitoring points 5 at a frequency of 2 times per day;

c. simultaneously detonating the blast holes 4 in the first adit 31 and the second adit 32 after blasting charge is completed, and then detonating the blast holes 4 at the third adit 32 and the slope toe after the slope surface deformation tends to be stable;

d. arranging water injection holes along the construction adits after the slope surface displacement deformation characteristics monitored at the surface displacement monitoring points tend to be convergent, wherein the water injection holes are parallel to the controlled blast holes, and a distance between each water injection hole and each blast hole is 1 m on a fracture surface;

e. performing cyclic high-pressure water injection work through the water injection holes in the three construction adits, wherein in the first water injection cycle, the water injection pressure is controlled as 2 MPa, the injection pressure of 2 MPa is maintained for not less than 5 hours, then the water injection pressure is reduced to 0.5 MPa, and the water injection pressure of 0.5 MPa is maintained for 2 days, so that soft rock at a blasting relaxation part is fully softened; after water injection is stopped; if surrounding rock deformation increment characteristics monitored at the surface displacement monitoring points 5 of slope surface surrounding rock tend to be stable within 5 days, a second water injection cycle is started; in the second water injection cycle, the water injection pressure is 0.5 MPa and is maintained for 3 days; if the surrounding rock deformation increment characteristics monitored at the surface displacement monitoring points 5 are observed to tend to be stable within 5 days after water injection is stopped, the next water injection cycle is started; the second water injection cycle is repeated until the slope surface surrounding rock deformation increment in the water injection process is generally less than 5% compared with accumulative deformation; it indicates that an operation of inducing toppling deformation of the slope is basically completed, and water injection is stopped;

f. injecting a cement grout into the slope foot in the third adit 33 by adopting the water injection holes after the slope is arranged for one month, reinforcing surrounding rock at the slope foot, controlling the grouting pressure as 0.2-0.3 MPa, and stopping grouting when a single-hole grouting rate is less than 0.5 L/min; and g. performing a normal excavation process of the toppling deformation slope.

What is claimed is:

1. A yieldable construction method for early releasing surrounding rock deformation on a weak counter-inclined slope, comprising: loosing a rock mass through controlled blasting; injecting water to soften the loosed rock mass produced by the blasting such that toppling deformation of the slope is induced; determining timing of water injection by monitoring slope surface displacement characteristics of the slope; and excavating the deformed slope after the injecting is completed.

2. The yieldable construction method of claim 1, comprising:
   a. excavating a plurality of construction adits inside a slope excavation contour line, drilling blast holes in the plurality of construction adits, and completing blasting charge;
   b. arranging a plurality of surface displacement monitoring points on a slope surface, and monitoring slope surface displacement deformation characteristics;
   c. detonating the blast holes;
   d. drilling water injection holes through the plurality of construction adits after the slope surface displacement deformation characteristics monitored at the surface displacement monitoring points tend to be stable;
   e. injecting high-pressure water into surrounding rock relaxation parts produced by detonation via the water injection holes until a slope surface surrounding rock deformation increment caused in the water injection process is 5% less than accumulative deformation, and stopping injecting water;
   f. injecting a cement grout into slope foot through the water injection holes; and
   g. excavating the deformed slope.

3. The yieldable construction method of claim 2, wherein in the step e, the water is injected into the water injection holes through a cyclic water injection method; and in each water injection cycle process, water injection pressure is maintained to inject the water for a certain period of time, and after the slope surface displacement deformation characteristics monitored at the surface displacement monitoring points tend to be stable after water injection is stopped, the next water injection cycle is started.

4. The yieldable construction method of claim 3, wherein in a first water injection cycle, the water injection pressure is controlled as 2 MPa, the injection pressure of 2 MPa is maintained for more than 5 hours, then the water injection pressure is reduced to 0.5 MPa, and the water injection pressure of 0.5 MPa is maintained for 2 days; in a second water injection cycle, the water injection pressure is controlled as 0.5 MPa, and the water injection pressure of 0.5 MPa is maintained for 3 days; and in an (n+2)th water injection cycle, the water injection pressure is controlled as 0.5 MPa, and the water injection pressure of 0.5 MPa is maintained for 3 days, wherein n is a positive integer.

5. The yieldable construction method of claim 2, wherein in the step f, a grouting pressure of the cement grout is controlled as 0.2-0.3 MPa, and when a single-hole grouting rate is less than 0.5 L/min, grouting is stopped.

6. The yieldable construction method of claim 2, wherein the plurality of construction adits comprise a first adit, a second adit and a third adit in sequence from top to bottom according to difference in elevations in the slope to be excavated; vertical elevation H1 of the first adit away from a slope opening line is equal to ⅓H, vertical elevation H2 of the second adit away from the slope opening line is equal to ⅔H, and the third adit is located at a slope toe excavation position; a vertical distance of each of the construction adits away from the slope surface is 0.2H-0.3H, and a vertical distance of each of the construction adits away from the excavation contour line is greater than or equal to 20 m and less than or equal to 40 m, wherein H is a height of a slope excavation area.

7. The yieldable construction method of claim 6, wherein a first blast hole is drilled at a side of the slope surface via the first adit at a drilling elevation angle of 25-40 degrees; a second blast hole is drilled at the side of the slope surface via the second adit at a drilling elevation angle of 25-40 degrees; a third blast hole and a fourth blast hole are drilled at the side of the slope surface via the third adit at a drilling elevation angle of 25-40 degrees and a downdip angle of 20-40 degrees, respectively;
   a length of a bottom of each of the first blast hole, the second blast hole and the third blast hole away from the slope surface is 5-8 m, and the forth blast hole covers the slope toe excavation position in a length direction.

8. The yieldable construction method of claim 7, wherein the water injection holes are formed parallel to the blast holes.

9. The yieldable construction method claim 6, wherein four rows of the surface displacement monitoring points are arranged, wherein an arrangement elevation of a first row of the surface displacement monitoring points is positioned at the slope opening line, a second row of and a third row of the surface displacement monitoring points are arranged in the middle of the slope in equal ratios according to the elevation, and an arrangement elevation of the fourth row of the surface displacement monitoring points is arranged at a position of 3-5 m away from an upper side of the excavated slope toe.

10. The yieldable construction method of claim 6, wherein the blast holes in the first adit and the second adit are detonated during blasting, and after the slope surface tends to be stable, the blast holes in the third adit are detonated.

* * * * *